United States Patent
Meribout et al.

(10) Patent No.: US 11,543,276 B2
(45) Date of Patent: Jan. 3, 2023

(54) MULTIPHASE FLOWMETER SYSTEM WITH A NON-RADIOACTIVE SENSOR SUBSYSTEM AND METHODS THEREOF

(71) Applicants: Khalifa University of Science and Technology, Abu Dhabi (AE); Abu Dhabi National Oil Company, Abu Dhabi (AE)

(72) Inventors: Mahmoud Meribout, Abu Dhabi (AE); Lyes Khezzar, Abu Dhabi (AE); Esra Al Hosani, Abu Dhabi (AE)

(73) Assignees: Khalifa University of Science and Technology; Abu Dhabi National Oil Company

( * ) Notice: Subject to any disclaimer, the term of this patent is extended or adjusted under 35 U.S.C. 154(b) by 0 days.

(21) Appl. No.: 17/641,017

(22) PCT Filed: Sep. 2, 2020

(86) PCT No.: PCT/IB2020/058185
§ 371 (c)(1),
(2) Date: Mar. 7, 2022

(87) PCT Pub. No.: WO2021/044319
PCT Pub. Date: Mar. 11, 2021

(65) Prior Publication Data
US 2022/0316928 A1    Oct. 6, 2022

Related U.S. Application Data

(60) Provisional application No. 62/896,181, filed on Sep. 5, 2019.

(51) Int. Cl.
*G01F 1/74* (2006.01)
*G01F 1/36* (2006.01)

(52) U.S. Cl.
CPC ............. *G01F 1/74* (2013.01); *G01F 1/363* (2013.01)

(58) Field of Classification Search
None
See application file for complete search history.

(56) References Cited

U.S. PATENT DOCUMENTS 9,541,435 B2    1/2017  Pors et al.
9,927,270 B2    3/2018  Xie
(Continued)

FOREIGN PATENT DOCUMENTS

CN    102759383 A    10/2012
CN    105115550 A    12/2015
(Continued)

OTHER PUBLICATIONS

International Search Report and Written Opinion for PCT Application No. PCT/IB2020/058185, dated Oct. 14, 2020, 9 pages.

*Primary Examiner* — Harshad R Patel
(74) *Attorney, Agent, or Firm* — Billion & Armitage

(57) ABSTRACT

Embodiments include a multiphase flowmeter system (300). The multiphase flowmeter system (300) may include a first inline flow conditioner (310) for reducing a slip velocity between a liquid phase and a gas phase of a multiphase fluid, a flowmeter for measuring a flow rate of the multiphase fluid, a second inline flow conditioner (350) for separating the liquid phase and the gas phase of the multiphase fluid, a non-radioactive sensor system for measuring one or more of a gas void fraction of the multiphase fluid and a water-cut of the multiphase fluid, and a processor (480) for computing one or more flow rates of the multiphase fluid. Embodiments further include methods of measuring one or more flow rates of a multiphase fluid and other related methods, apparatuses, devices, and systems.

20 Claims, 10 Drawing Sheets

(56) References Cited

U.S. PATENT DOCUMENTS

| | | |
|---|---|---|
| 10,197,698 B2 | 2/2019 | Reiderman et al. |
| 10,280,722 B2 | 5/2019 | Bello et al. |
| 2011/0259119 A1 | 10/2011 | Steven |
| 2019/0009405 A1 | 1/2019 | Ko et al. |
| 2019/0063215 A1 | 2/2019 | Dai et al. |

FOREIGN PATENT DOCUMENTS

| | | |
|---|---|---|
| EP | 0236405 A1 | 9/1987 |
| EP | 0684458 A2 | 11/1995 |
| GB | 2411476 A | 8/2005 |

MULTIPHASE FLOWMETER SYSTEM WITH A NON-RADIOACTIVE SENSOR SUBSYSTEM AND METHODS THEREOF

BACKGROUND

Despite technological advances in renewable energy, hydrocarbons will likely remain a primary source of energy for decades to come. Nevertheless, with continuous depletion of hydrocarbon resources in oil fields, and continuous growing demand of energy which is expected to rise by up to 50% by year 2040, efficient production management is required, through accurate and online monitoring of individual wells, using low cost and compact multiphase flow meters. For instance, knowing the amount of produced water, gas, and oil per well can facilitate reservoir engineering and improve the recovery factor by shutting the less efficient producing wells and treat them with a suitable enhanced oil recovery (EOR) technique. Conventional techniques for determining these parameters, such as γ-ray sensors and the like, are hazardous, expensive, fail to provide real-time measurements, provide poor representations of multiphase flow as a whole, and/or is not equipped to handle gas phase. Accordingly, improved techniques would advance the art and provide more efficient production management options.

SUMMARY

In one or more aspects of the invention, a multiphase flow meter system for measuring one or more properties of a multiphase fluid is provided. The multiphase flow meter system may include one or more of the following modules: a first inline flow conditioner for reducing a slip velocity between a liquid phase and a gas phase of the multiphase fluid, wherein the first inline flow conditioner receives the multiphase fluid from a flow inlet; a flow meter including one or more flow sensors for communicating data representing a total flow rate of the multiphase fluid, wherein the flow meter is downstream from and fluidly connected to the first inline flow conditioner; a second inline flow conditioner for separating the liquid phase and the gas phase of the multiphase fluid, wherein the second inline flow conditioner is downstream from and fluidly connected to the flow meter; a non-radioactive sensor subsystem for communicating data representing a gas void fraction of the multiphase fluid and a water-cut of the multiphase fluid, wherein the non-radioactive sensor subsystem is downstream from the second inline flow conditioner; and a processor for receiving data from the flow meter and the non-radioactive sensor subsystem and computing a flow rate of the liquid phase and a flow rate of the gas phase of the multiphase fluid.

In one or more further aspects of the invention, a method of measuring one or more flow rates of a multiphase fluid is provided. The method may include one or more of the following steps: flowing a multiphase fluid including a gas phase and a liquid phase through a first inline flow conditioner to reduce a slip velocity between the gas phase and the liquid phase; flowing the multiphase fluid through a flow meter including one or more sensors for communicating data representing a total flow rate of the multiphase fluid to a processor; flowing the multiphase fluid through a second inline flow conditioner for separating the liquid phase and the gas phase of the multiphase fluid; and flowing the multiphase fluid through a non-radioactive sensor subsystem which communicates data representing a gas void fraction of the multiphase fluid and a water-cut of the multiphase fluid to the processor; wherein the processor computers a flow rate of the liquid phase and the gas phase of the multiphase fluid using the data communicated by the flow meter and the non-radioactive sensor subsystem.

DETAILED DESCRIPTION

Discussion

The present invention provides multiphase flow meter systems for measuring one or more properties of a multiphase fluid. The multiphase flow meter systems disclosed herein are not only low cost, but also readily and easily integrable with onshore oil production facilities and offshore oil production facilities to improve the performance and management of operations at those facilities. For example, one or more multiphase flow meters may be integrated with oil production facilities, either onshore or offshore, to provide real-time, accurate data concerning, among other things, one or more of the amount of water produced per well, the amount of oil produced per well, and the amount of gas produced per well. This information may be used to improve oil production facilities by, for example, facilitating reservoir engineering, indicating which wells are underperforming and/or inefficient, and directing whether wells should be taken offline or shut-down for treatment to improve a recovery factor. In addition, the multiphase flow meters disclosed herein do not require the use of gamma ray-sensors and thus are safer and less hazardous than conventional flow meters.

Figure 1:
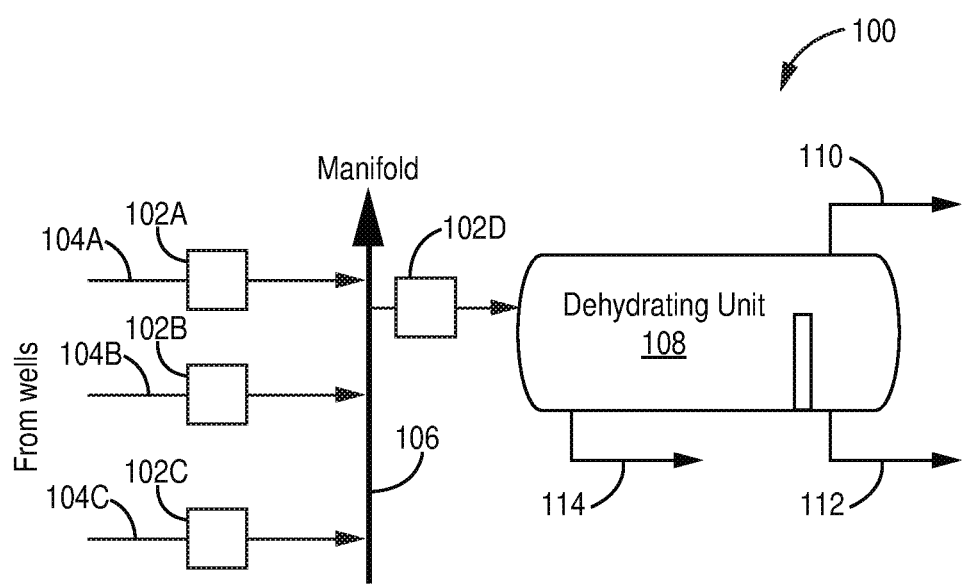
FIG. 1 is a schematic diagram of a system and process including a multiphase flow meter system for measuring one or more properties of a multiphase fluid flowing through a pipeline segment located at or near the surface of an onshore oil field, according to one or more embodiments of the invention.

FIG. 1 is a schematic diagram of a portion of an onshore oil production facility including one or more multiphase flow meter systems, according to one or more embodiments of the invention. As shown in FIG. 1, the portion of the onshore oil production facility and process 100 may include one or more oil production wells 104A, 104B, 104C. A manifold 106 may be fluidly connected to the oil production wells 104A, 104B, 104C for aggregating the multiphase fluid. A dehydrating unit 108 may be fluidly connected to the manifold 106 with three exit streams—namely, a gas stream 110 which may flow to a compression unit (not shown), an oil stream 112 which may flow to a separator unit (not shown), and a water stream 114 which may flow to a water treatment unit (not shown). In addition, one or more multiphase flow meter systems 102A, 102B, 102C, 102d may be used to measure one or more properties of a multiphase fluid flowing through a pipeline segment located at, or near, the surface of an onshore processing station of the onshore oil production facility 100. In some embodiments, the one or more multiphase flow meter systems 102A, 102B, 102C are located immediately downstream the one or more oil production wells 104A, 104B, 104C to provide estimates regarding the oil production rate of each well. This information may be used to optimize oil reservoir management and/or to shut down or take offline underperforming wells (e.g., wells with lower oil production rates). In some embodiments, the one or more multiphase flow meter system 102D is located immediately downstream the manifold 106 and/or upstream from the dehydrating tank 108 to determine, in real-time, the aggregated oil production rate.

Figure 2:
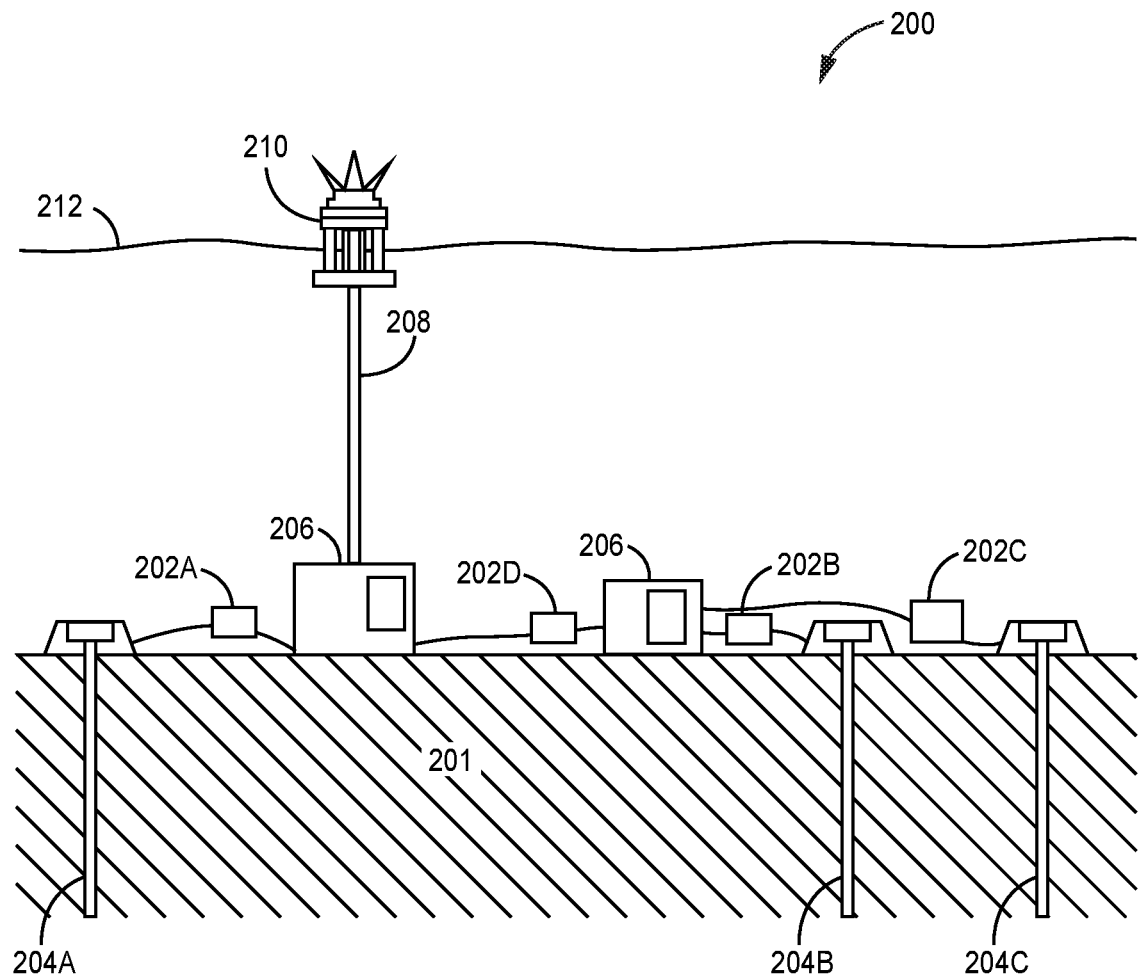
FIG. 2 is a schematic diagram of a system and process including a multiphase flow meter system for measuring one or more properties of a multiphase fluid flowing through a pipeline segment located undersea in an offshore oil field, according to one or more embodiments of the invention.

FIG. 2 is a schematic diagram of a portion of an undersea offshore oil production facility including one or more multiphase flow meter systems, according to one or more embodiments of the invention. As shown in FIG. 2, the portion of the offshore oil production facility and process 200 may include one or more oil production wells 204A, 204B, 204C in an undersea oil reservoir 201. One or more manifolds 206 may be fluidly connected to the one or more oil production wells 204A, 204B, 204C. The one or more manifolds 206 may be fluidly connected to a vertical flowline conduit 208. An oil production platform 210 may be fluidly connected to the vertical flowline conduit 208. The multiphase flow meter systems are sufficiently compact such that they can be deployed in subsea production settings. In some embodiments, one or more multiphase flow meter systems 202A, 202B, 202C are located undersea or below sea level 212, immediately downstream the one or more oil production wells 204A, 204B, 204C to measure, in real-time, the multiphase flow (e.g., the gas phase flow rate and the liquid phase flow rate (e.g., the oil flow rate and/or water flow rate)) of each oil production well. In some embodiments, one or more multiphase flow meter systems 202D is located immediately downstream a manifold 206 to measure the aggregated oil, water, and gas production.

Figure 3:
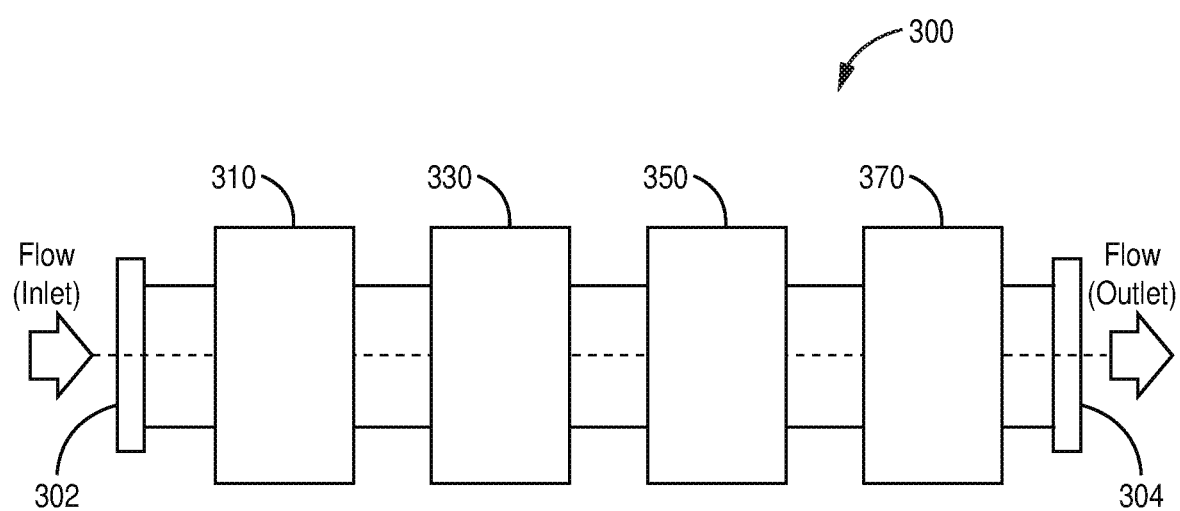
FIG. 3 is a schematic diagram of a multiphase flow meter system and process for measuring one or more properties of a multiphase fluid, according to one or more embodiments of the invention.

FIG. 3 is a schematic diagram of a multiphase flow meter system and process 300, installed on a conduit, for measuring one or more properties of a multiphase fluid, according to one or more embodiments of the invention. Certain benefits of the multiphase flow meter system 300 include, without limitation, that said multiphase flow meter 300 may provide accurate real-time measurements of one or more properties of a multiphase fluid, which may include at least a gas phase and a liquid phase. Examples of properties which may be monitored, measured, and/or determined by the multiphase flow meter 300 include, without limitation, a flow rate of the multiphase fluid (e.g., a total flow rate, an oil flow rate, a water flow rate, and/or a gas flow rate), a flow composition of the multiphase fluid (e.g., a water fraction, a gas fraction, and/or an oil fraction of the multiphase fluid), and a density of at least one phase (e.g., a water density and/or an oil density) of the multiphase fluid. In addition, the multiphase flow meter 300 is modular and compact. Furthermore, the multiphase flow meter 300 may be operated under harsh conditions, including high pressures, either above or below the surface or deep beneath the undersea in, for example, onshore oil fields and offshore oil fields, respectively. The multiphase flow meter 300 is less hazardous and less costly than conventional meters which utilize gamma-ray sensors or probes.

As used herein, the term "multiphase fluid" generally refers to any fluid including a liquid phase and a gas phase. In some embodiments, the liquid phase of the multiphase fluid includes a first liquid and a second liquid. For example, in some embodiments, the multiphase fluid includes a gas phase and a liquid phase including a first liquid and a second liquid. In some embodiments, one or more of the first liquid and the second liquid includes one or more of oil and water. In some embodiments, the multiphase fluid does not include any solids. For example, in some embodiments, the multiphase fluid includes fluids with gas flow and one or more liquids, but no solids. The term "measuring," as in measuring one or more properties of the multiphase fluid, may include monitoring one or more properties of said fluid, measuring one or more properties of said fluid, determining one or more properties of said fluid, computing one or more properties of said fluid, and/or communicating data representing one or more properties of said fluid. The one or more properties are not particularly limited and may include, for example and without limitation, one or more of an oil fraction, a water fraction, a gas fraction, an oil flow rate, a water flow rate, a gas flow rate, an oil density, and a water density.

The multiphase flow meter system 300 may include one or more modules 310, 330, 350, 370 installed on a segment of a pipeline, located between a flow inlet 302 and a flow outlet 304. As shown in FIG. 3, the one or more modules of the multiphase flow meter system 300 may include one or more of a first inline flow conditioner 310, a flow meter 330, a second inline flow conditioner 350, a sensor system 370, and a processor (not shown). In the illustrated embodiment, the first inline flow conditioner is downstream, optionally immediately downstream, from the flow inlet 302; the flow meter 330 is located downstream, optionally immediately downstream, from the first inline flow conditioner 310; the second inline flow conditioner 350 is located downstream, optionally immediately downstream, from the flow meter 330; the sensor system 370 is located downstream, optionally immediately downstream, from the second inline flow conditioner 350; and the flow outlet 304 is located downstream, optionally immediately downstream, from the sensor system 370. In other embodiments, one or more of the flow inlet 302, the flow outlet 304, the first inline flow conditioner 310, the flow meter 330, the second inline flow conditioner 350, and the sensor system 370 may be arranged in a different configuration or order. In further embodiments, the multiphase flow meter 300 may include one or more additional components, including conventional components, such as valves, pumps, sensors, regulators, and the like.

In some embodiments, the first inline flow conditioner 310 includes a flow homogenizer which is utilized for homogenizing the flow of the multiphase fluid prior to the multiphase fluid flowing through the flow meter 330. For example, in some embodiments, the first inline flow conditioner 310 may be used to reduce a slip velocity between at least a gas phase and a liquid phase of the multiphase fluid. The slip velocity may refer to the difference between the velocity, or average velocity, of two different fluids flowing through a conduit. For example, in some embodiments, the slip velocity includes the difference between the velocity or average velocity of the gas phase and the velocity or average velocity of the liquid phase. By reducing the difference in the velocities between the two phases—e.g., the gas phase and the liquid phase—the flow of the multiphase fluid may be considered to be homogenized. Homogenizing the multiphase fluid may permit and/or improve the accuracy of flow rate measurements obtained from the flow meter. In some embodiments, the flow homogenizer may include a horizontal pipe segment and a vertical pipe segment fluidly connected via a 90° pipe elbow, wherein the horizontal pipe segment is upstream from the 90° pipe elbow and the vertical pipe segment.

In some embodiments, the flow meter 330 is utilized for measuring a flow rate of the multiphase fluid. The flow rate may include a total flow rate, such as for example a total volumetric flow rate and/or a total mass rate. In some embodiments, the flow meter 330 includes a differential pressure meter, such as a venturi meter, for measuring the total volumetric flow rate of the multiphase fluid. For example, in some embodiments, the flow meter 330 may include one or more flow sensors for communicating data representing a total flow rate of the multiphase fluid. In some embodiments, the one or more flow sensors include a first pressure sensor and a second pressure sensor for communicating data representing a differential pressure between the first pressure sensor and the second pressure sensor to a processor which computes the total volumetric flow rate of the multiphase fluid. In some embodiments, the flow meter 330 is a venturi meter located immediately downstream from the first flow conditioner 310 and oriented in a vertical position such that a multiphase fluid flows upwardly through an inlet and an outlet of the venturi meter. In some embodiments, the flow meter 330 includes other types of flow meters, including, for example and without limitation, one or more of an orifice meter, a pitot tube meter, a vortex meter, or a V-cone meter to measure the total flow rate. In some embodiments, a Coriolis flow meter is used for measuring the total flow rate.

In some embodiments, the second inline flow conditioner 350 is utilized for separating the liquid phase and the gas phase of the multiphase fluid. The second inline flow conditioner 350 may include a flow conditioner. The flow conditioner is generally not particularly limited and may include any flow conditioner suitable for separating the liquid phase and the gas phase. In some embodiments, the second inline flow conditioner 350 generates an annular flow. For example, in some embodiments, the second inline flow conditioner 350 includes a swirl cage, wherein the swirl cage generates an annular flow in which an outer phase includes the liquid phase and an inner phase includes the gas phase. In some embodiments, the swirl cage generates an annular flow without a significant pressure drop across the second inline flow conditioner 350. In some embodiments, the second inline flow conditioner 350 generates a stratified flow. For example, in some embodiments, the second inline flow conditioner 350 generates a stratified multiphase fluid flow in which the liquid phase flows in a first portion of a conduit (e.g., a top portion, a bottom portion, a left side portion, and/or a right side portion) and the gas phase flows in a second portion of the conduit (e.g., a top portion, a bottom portion, a left side portion, and/or a right side portion).

In some embodiments, the sensor subsystem 370 is utilized for measuring one or more properties of the multiphase fluid. In some embodiments, the one or more properties of the multiphase fluid may include one or more of a flow rate of the multiphase fluid, a flow composition of the multiphase fluid, and a density of at least one phase of the multiphase fluid. In some embodiments, the sensor subsystem 370 includes a non-radioactive sensor subsystem. In some embodiments, the sensor subsystem 370 includes a liquid-gas fraction measurement sensor for communicating data representing a gas void fraction of the multiphase fluid. In some embodiments, the liquid-gas sensor measures a flow channel volume or a cross-sectional area of a channel occupied by the gas phase. In some embodiments, the sensor subsystem 370 includes a water-cut meter (e.g., a water-cut sensor) for communicating data representing a water-cut of the multiphase fluid. In some embodiments, the water-cut meter is located downstream from the liquid-gas fraction measurement sensor. In some embodiments, the sensor subsystem 370 includes an ultrasonic probe for communicating data representing a gas void fraction of the multiphase fluid and a water-cut of the multiphase fluid. In some embodiments, the ultrasonic probe includes one or more ultrasonic elements for emitting an ultrasonic wave.

In some embodiments, a processor (not shown) is utilized for transmitting and/or receiving data. For example, in some embodiments, the processor is utilized for receiving data communicated by one or more of the flow meter 330 and the sensor subsystem 370 and for computing one or more properties of the multiphase fluid. The processor may further include memory for storing programs and/or instructions for computing the one or more properties of the multiphase fluid and/or circuitry for communicating, for example transmitting and/or receiving data signals, with one or more of the flow meter 330 and the sensor subsystem 370. In some embodiments, the processor includes a transmitter in communication with the ultrasonic probe—and in particular the one or more ultrasonic elements of the ultrasonic probe—for generating ultrasonic waves. For example, in some embodiments, the processor includes one or more of a low-noise amplifier, an analog-to-digital converter, a main processing unit, a local oscillator, a power amplifier, and a multiplexer/demultiplexer.

Figure 4:
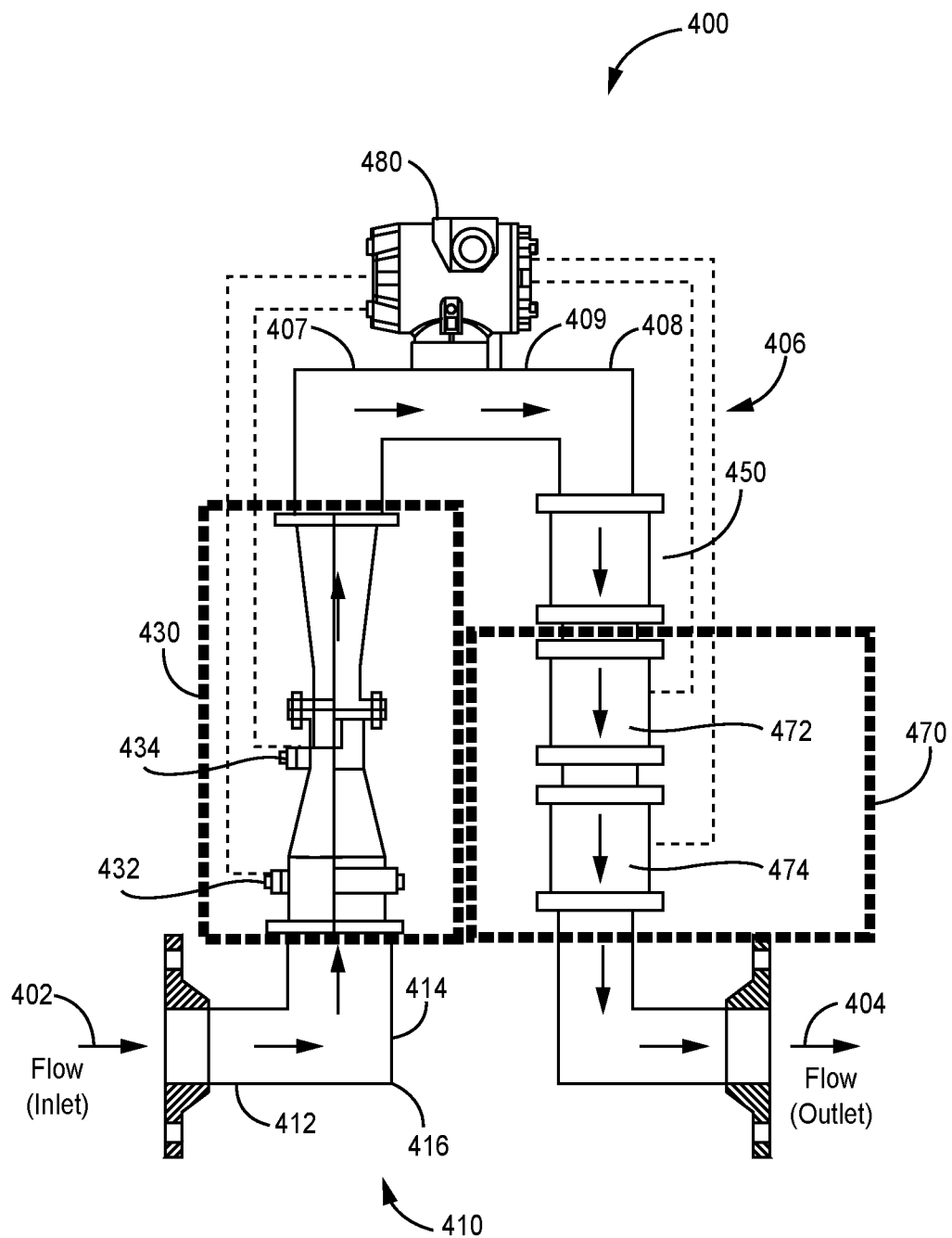
FIG. 4 is a schematic diagram of a multiphase flow meter system and process for measuring one or more properties of a multiphase fluid, according to one or more embodiments of the invention.

FIG. 4 is a schematic diagram of a multiphase flow meter system and process 400, according to one or more embodiments of the invention. As shown in FIG. 4, the multiphase flow meter system 400 may be installed on a segment of a pipeline, between a flow inlet 402 and a flow outlet 404. A multiphase fluid including a gas phase including one or more gases and a liquid phase including one or more liquids, and optionally no solids, may enter the multiphase flow meter system 400 through the flow inlet 402. A flow homogenizer 410 for generating a homogenized flow, in which the slip velocity between the gas phase and the liquid phase is reduced, may be located downstream, optionally immediately downstream, from the flow inlet 402. The flow homogenizer 410 may include a horizontal pipe segment 412 and a vertical pipe segment 414 fluidly connected via a 90° pipe elbow 416. In some embodiments, the 90° pipe elbow 416 generates, or at least contributes to generating, the homogenized flow. The multiphase fluid may be directed from the flow inlet 402 to the horizontal pipe segment 412 through the 90° pipe elbow 416 to the vertical pipe segment 414 such that the multiphase fluid discharged from the vertical pipe segment 414 is flowing in an upwardly direction.

A differential pressure meter 430 for measuring a flow rate, such as a total volumetric/mass flow rate of the multiphase fluid, may be located downstream, optionally immediately downstream, from the flow homogenizer 410. For example, in some embodiments, the differential pressure meter 430 is fluidly connected to the vertical pipe segment 414 of the flow homogenizer 410. The differential pressure meter 430 may include a first pressure sensor 432 and a second pressure sensor 434 downstream from the first pressure sensor 432. The first pressure sensor 432 and the second pressure sensor 434 may generate an output signal related to a differential pressure between the first pressure sensor 432 and the second pressure sensor 434. The output differential pressure signal may be communicated to a processor 480, where the communicated pressure signal may be monitored, processed, or analyzed by the processor 480 to determine a total flow rate of the multiphase fluid flowing through the differential pressure meter. In some embodiments, the total flow rate, Q, of the multiphase fluid flowing through the differential pressure meter is defined by equation (1):

$$Q = K\sqrt{\frac{\Delta P}{\rho_{mix}}} \quad (1)$$

where ΔP is a differential pressure between the first pressure sensor 432 and the second pressure sensor 434, $\rho_{mix}$ is a mixed density of the multiphase fluid, and K is a constant coefficient which may depend on the dimensions of the differential pressure meter. In some embodiments, the differential pressure meter 430 includes a venturi meter. In other embodiments, the differential pressure meter may be replaced by other types of flow meters, including, for example and without limitation, orifice meters, pitot tube, vortex, V-cone meters, or a Coriolis flow meter.

A conduit 406 for changing the direction of the multiphase fluid may be located downstream, optionally immediately downstream, from the differential pressure meter 430 which may discharge into the conduit 406. The conduit 406 may change the direction of the multiphase fluid flow from an upwardly flowing direction to a downwardly flowing direction. For example, in some embodiments, the conduit 406 includes a first 90° pipe elbow 407, a second 90° pipe elbow 408, and a horizontal pipe segment 409 fluidly connected to the first 90° pipe elbow 407 and the second 90° pipe elbow 408. From the differential pressure meter 430, the multiphase fluid may flow upwardly through the first 90° pipe elbow through the horizontal pipe segment 409 and down the second 90° pipe elbow 408.

A second inline flow conditioner 450 for separating the gas phase and the liquid phase may be located downstream, optionally immediately downstream, from one or more of the differential pressure meter 430 and the conduit 406. In embodiments including the conduit 406, the second inline flow conditioner 450 may be provided in a vertical orientation, which may be downwardly oriented, such that it receives fluid discharged in a downwardly flowing direction from the second 90° pipe elbow 408. In some embodiments, the second inline flow conditioner 450 generates an annular flow in which an outer phase includes the liquid phase and an inner phase includes the gas phase. For example, in some embodiments, the second inline flow conditioner 450 includes a swirl cage for generating the annular flow. In other embodiments, the second inline flow conditioner 450 generates a stratified flow in which, for example, the liquid phase and gas phase are separated.

A sensor subsystem 470 for measuring one or more properties of the multiphase fluid may be located downstream, optionally immediately downstream, from the second inline flow conditioner 450. The sensor subsystem 470 may include one or more sensors for monitoring, measuring, and/or determining one or more properties of the multiphase fluid. In some embodiments, the one or more sensors generate an output signal related to a sensed property or a property to be sensed and the output signal, or data, is communicated to the processor 480, where the one or more communicated output signals may be processed and/or analyzed to determine one or more properties of the multiphase fluid. In some embodiments, the sensor subsystem 470 includes one or more sensors for measuring, monitoring, and/or determining a flow composition of the multiphase fluid. At least one benefit of the invention is that the sensor subsystem 470 may include a non-radioactive sensor subsystem 470. In some embodiments, for example, the sensor subsystem 470 does not include, nor utilize, a gamma ray-sensor.

In some embodiments, the sensor subsystem 470 includes one or more of a gas void fraction (GVF) measurement sensor (e.g., a gas void fraction meter) 472 and a water-cut meter 474. In some embodiments, the water-cut meter 474 is located downstream, optionally immediately downstream, from the GVF measurement sensor 472. In some embodiments, the GVF measurement sensor 472 may communicate data representing the gas void fraction of the multiphase fluid. In some embodiments, the water-cut meter 474 may communicate data representing the water fraction of the multiphase fluid. One or more of the output GVF signal and the output water-cut signal may be communicated to the processor 480, wherein the communicated output GVF signal and/or the communicated output water-cut signal may be processed and/or analyzed to determine one or more of the oil fraction of the multiphase fluid, the water fraction of the multiphase fluid, and the gas fraction of the multiphase fluid. For example, in some embodiments, equation (2A) for the gas void fraction, GVF, and equation (2B); and equation (2C) for the water-cut, WF, and equation (2D), may be used by the processor 480 to determine said fractions:

$$GVF = \frac{\alpha_{Gas}}{\alpha_{Gas} + \alpha_{liquid}} \quad (2A)$$

$$\alpha_{Liquid} = \alpha_{Water} + \alpha_{Oil} \quad (2B)$$

$$WC = \frac{\alpha_{Water}}{\alpha_{Liquid}} \quad (2C)$$

$$\alpha_{Water} + \alpha_{Oil} + \alpha_{Gas} = 1 \quad (2D)$$

where $\alpha_{Gas}$ is the gas fraction of the multiphase fluid, $\alpha_{Liquid}$ is the liquid fraction of the multiphase fluid, $\alpha_{water}$ is the water fraction of the multiphase fluid, and $\alpha_{oil}$ is the oil fraction of the multiphase fluid.

Using the GVF measurement sensor to determine the parameters $\alpha_{Liquid}$ and $\alpha_{Gas}$ and using the water-cut meter to determine the parameter $\alpha_{water}$ and consequently $\alpha_{oil}$, the $\rho_{mix}$ may be determined using equation (3):

$$\rho_{mix} = \rho_{Oil} \times \alpha_{Oil} + \rho_{Water} \times \alpha_{Water} + \rho_{Gas} \times \alpha_{Gas} \quad (3)$$

where $\rho_{oil}$, $\rho_{water}$, and $\rho_{gas}$ as are the density of oil, the density of water, and the density of gas, respectively. The individual flow rates of the oil, $Q_{Oil}$, the water, $Q_{water}$, and the gas, $Q_{Gas}$, can then be determined using equation (4A), equation (4B), and equation (4C):

$$Q_{Oil} = Q \times \alpha_{Oil} \quad (4A)$$

$$Q_{Water} = Q \times \alpha_{Water} \quad (4B)$$

$$Q_{Gas} = Q \times \alpha_{Gas} \quad (4C)$$

Ultrasonic probes, such as liquid-type ultrasonic probes, may be particularly well suited to handle annular flows and/or stratified flows from the second inline flow conditioner 450. Accordingly, in some embodiments, the sensor system 470 includes an ultrasonic probe including one or more ultrasonic elements for emitting ultrasonic waves. The ultrasonic probe may be utilized to measure, monitor, and/or determine one or more of a gas void fraction (GVF) of the multiphase fluid, a water-cut of the multiphase fluid, and a density of at least one phase of the multiphase fluid. For example, in some embodiments, an ultrasonic probe may be used to measure the density of a liquid phase including only one type of liquid. In some embodiments, an ultrasonic probe may be used to measure the density of a liquid phase including two types of liquids, such as oil and water, provided that the density of one of the two types of liquids is known. For example, in embodiments in which a liquid phase includes oil and water, the density of water is usually constant and approximately equal to about 1,000 kg/m³, whereas the density of oil, which may vary from between about 750 to about 950 kg/m³, may be the parameter which is measured.

In addition, ultrasonic waves provide certain benefits over other types of electromagnetic radiation, such as electromagnetic radiation of wavelengths other than ultrasonic wavelengths. For example, electromagnetic waves, such as microwaves, are highly damped in highly conductive mediums (e.g. salty water). In addition, optical waves, such as infrared waves, are highly attenuated in opaque mediums, such as crude oil and dust. Unlike electromagnetic waves and optical waves, ultrasonic waves have an advantage in that they strongly propagate into a liquid phase for relatively long distances regardless of the salinity, the conductivity, and the opacity of the medium through which the ultrasonic wave is propagated. Although, in some instances, ultrasonic waves may be attenuated within a liquid phase in which a gas phase is present, which may explain their rare use in multiphase flow applications either for flow composition measurement, or flow rate measurement, in some embodiments, the second inline flow conditioner, such as an inline liquid-gas separator, may be placed immediately upstream a sensor system 470 including an ultrasonic probe to overcome this challenge.

Figure 5A:
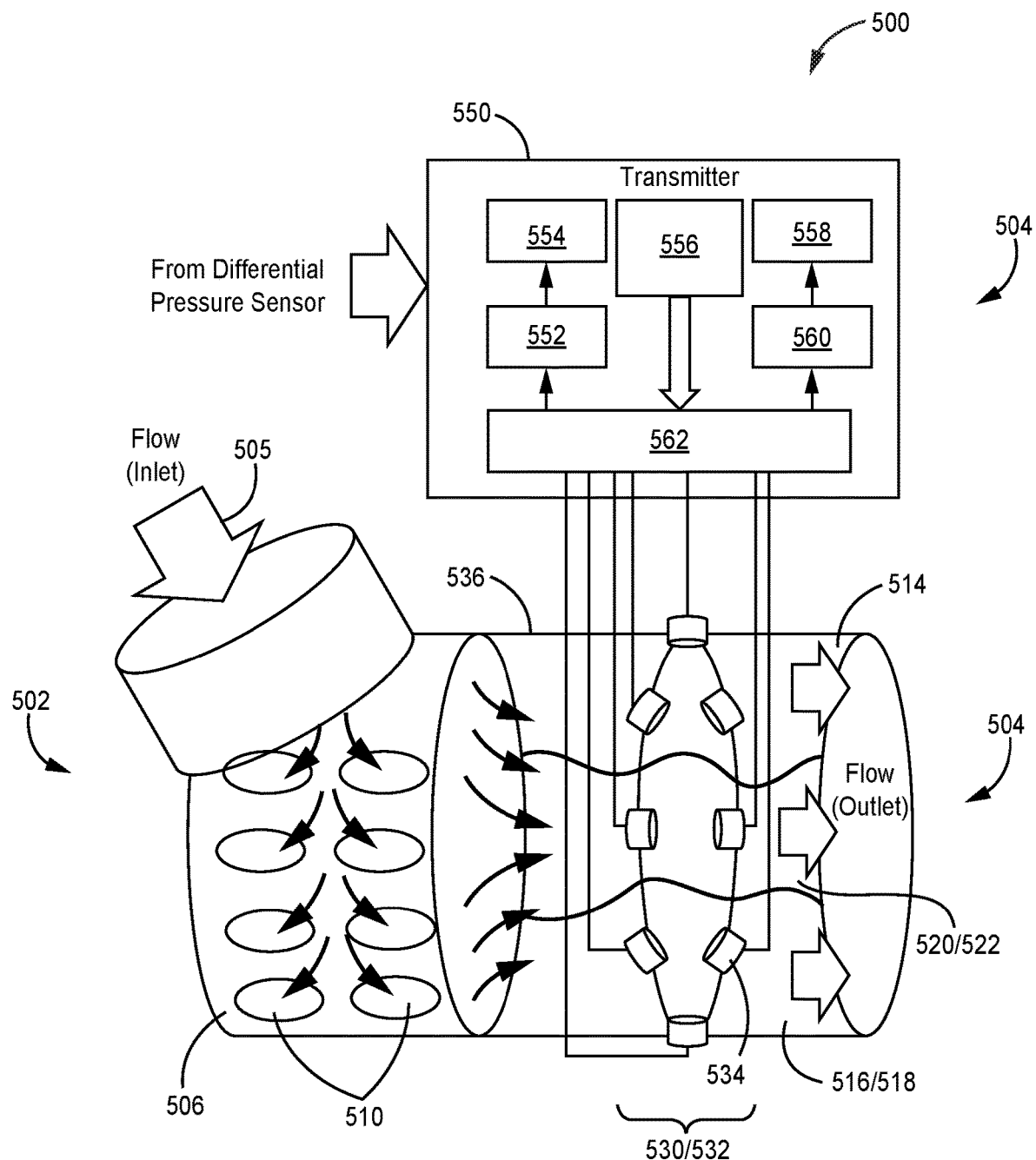
FIGS. 5A-5B are schematic diagrams of a portion of a multiphase flow meter system for measuring one or more properties of a multiphase fluid in annular flow, the portion including an inline flow conditioner and a non-radioactive sensor system, where (A) presents an isometric view of said portion and where (B) presents a cross-sectional view of said portion, according to one or more embodiments of the invention.
Figure 5B:
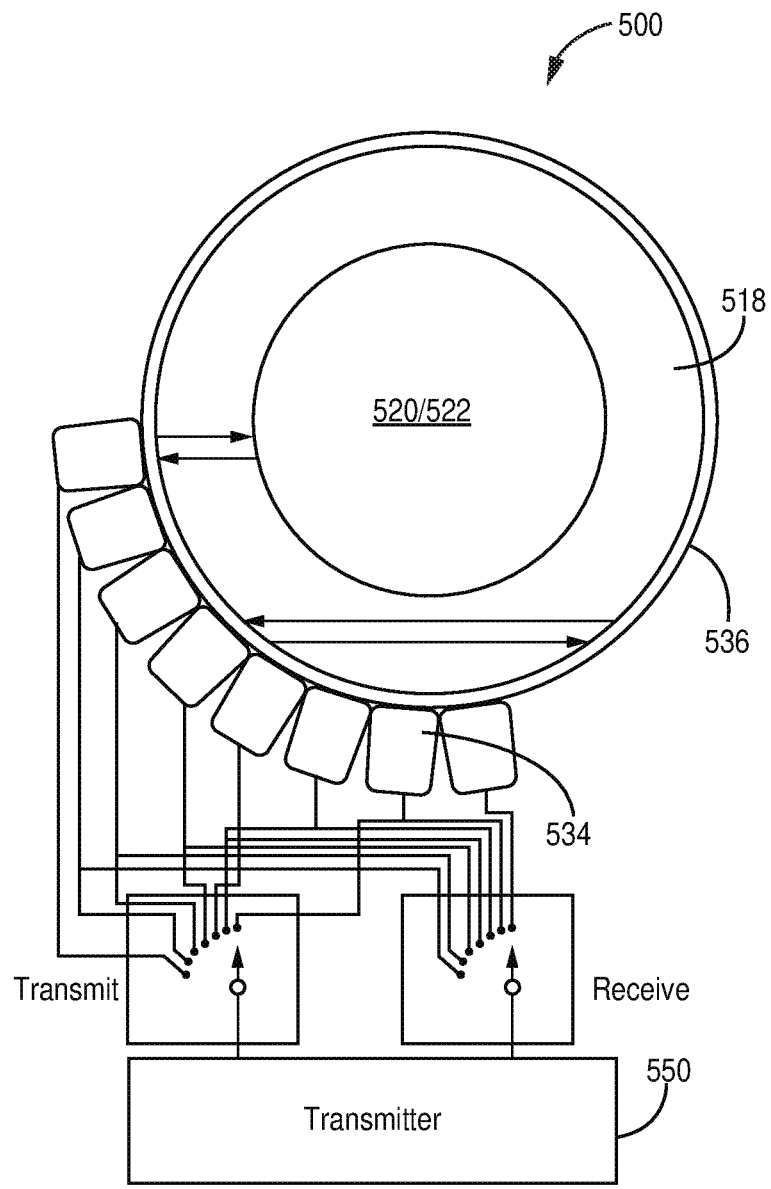

FIGS. 5A-5B are (A) an isometric view and (B) a cross-sectional view of a conduit including a multiphase fluid in annular flow, according to one or more embodiments of the invention. As shown in FIGS. 5A-5B, a flow conditioner 502 may include a flow inlet 505 and a swirl cage 506 including a cylindrical pipe 508 including one or more orifices 510, or holes, through which a multiphase fluid 512 may tangentially penetrate to generate an annular flow 514 with an outer phase 516 including the liquid phase 518 and an inner phase 520 including the gas phase 522. In some embodiments, the sensor system 504 includes an ultrasonic probe 530 including an array 532 (e.g., a circular array) of ultrasonic elements 534. The array 532 of ultrasonic elements 534 may include a plurality of ultrasonic elements 534. In some embodiments, the ultrasonic elements 534 may be clamped onto a segment of a pipeline 536. For example, as shown, a plurality of ultrasonic elements 534 may be adjacently arranged in a circular array around an outer surface of the conduit. In some embodiments, an optional acoustic matching layer 538 (not shown) is provided between one or more of the ultrasonic elements 534 and the pipeline 536 to remove an air gap which may be introduced between the one or more ultrasonic elements 534 and the liquid phase 518. In some embodiments, the ultrasonic elements 534 may be in direct contact with the liquid phase 518.

Each ultrasonic element of the plurality of ultrasonic elements may be in communication with a transmitter 550 which is configured to transmit and receive signals from at least each of the plurality of ultrasonic elements. Although not shown, in some embodiments, the transmitter 550 is in communication with one or more other modules disclosed herein, such as a flow meter. In some embodiments, the transmitter 550 is configured to communicate with the one or more ultrasonic elements 534 to generate ultrasonic waves. For example, in some embodiments, the transmitter 550 includes a low noise amplifier 552, an analog-to-digital converter 554, a main processing unit 556, a local oscillator 558, a power amplifier 560, and a multiplexer/demultiplexer 562. In some embodiments, the transmitter 550 is also configured to receive data from one or more sensors of a flow meter, such as the first pressure sensor and the second pressure sensor of a venturi meter. In some embodiments, the transmitter 550 receives and/or transmits data and computes one or more properties of the multiphase fluid.

In some embodiments, one or more of the ultrasonic elements 534 are excited in a time multiplexed manner to generate (e.g., emit) at least two different kinds of ultrasonic waves. In some embodiments, a first kind of ultrasonic wave includes an ultrasonic wave which hits a wall of the probe to determine a water-cut value, WC, by measuring the time of flight of the corresponding wave, $T_{echo1}$, using the equation (5):

$$T_{echo1} = \frac{1}{2} \times \frac{1}{((v_W \times Wc) + (v_O \times (1 - Wc))/d)} \quad (5)$$

where vw is the velocity of the ultrasonic waves in water, vo is the velocity of ultrasonic waves in oil, and d is the distance between the ultrasonic sensor generating the ultrasonic wave 20 and the symmetrical side of the wall. In embodiments in which an acoustic matching layer of thickness $d_m$ is used, between the clamp-on ultrasonic elements 534 and the liquid layer, the above equation may be rewritten as equation (6):

$$T_{echo1} = \frac{1}{2} \times \frac{1}{((v_W \times Wc) + (v_O \times (1 - Wc))/(d - d_m)) + (v_m/2d_m)} \quad (6)$$

where $v_m$ is the velocity of ultrasonic waves in the matching medium.

In some embodiments, the determination of the GVF value may require exploring the signal associated with a second ultrasonic wave, 21, which is reflected by the inner gas phase according to equation (7A) and equation (7B):

$$T_{echo2} = \frac{1}{2} \times \frac{L_{liquid}}{((v_W \times Wc) + (v_O \times (1 - Wc)))} \quad (7A)$$

$$GVF = \frac{D - 2L_{liquid}}{D} \quad (7B)$$

where $L_{liquid}$ is the thickness of the liquid film and D is the probe diameter. In embodiments in which a matching layer of thickness $d_m$ is used, between the clamp-on ultrasonic elements 534 and the liquid layer, the above equation can be rewritten as equation (8):

$$T_{echo2} = \frac{1}{2} \times \frac{1}{((v_W \times W_C) + (v_O \times (1 - W_C)))/L_{Liquid} + (v_m/d_m)} \quad (8)$$

where $v_m$ is the velocity of ultrasonic waves in the medium. Using the above equations, the fractions $\alpha_{gas}$, $\alpha_{water}$, and $\alpha_{oil}$ can be determined using equation (9A), equation (9B), and equation (9C):

$$\alpha_{Gas} = \frac{D - 2L_{liquid}}{D} \quad (9A)$$

$$\alpha_{Water} = WC \times \frac{2L_{liquid}}{D}, \text{ and} \quad (9B)$$

$$\alpha_{Oil} = (1 - WC) \times \frac{2L_{liquid}}{D} \quad (9C)$$

The use of one or more ultrasonic elements permits accurate tracking of the liquid phase and accordingly provides accurate measurements of both the water-cut and the gas void fraction (GVF). At least one advantages of the apparatus is that it permits determinations of the fluid density in embodiments in which the liquid phase includes one single type of liquid (e.g. only oil fluid), where Equation 1 may be rewritten as equation (10):

$$T_{echo1} = \frac{1}{2} \times \frac{1}{(v_O)/d} \quad (10)$$

Equation 10 permits a determination of the velocity of ultrasonic waves in an oil medium, which, in turn, is proportional to the density of oil. The density of the produced liquid is required to be known in real-time for a number of reasons. For instance, in a wellbore, the liquid density needs to be above a threshold to avoid situations where the formation pressure overcomes the hydrostatic head of the liquid, causing a blowout. In addition, the liquid density should be lower than a threshold density value to avoid situations where the formation is accidentally fractured by the liquid and/or the liquid fluid leaks excessively into the formation causing a blowout due to liquid penetrating into the formation.

In other embodiments in which the liquid phase includes two types of fluids, such as oil and water liquids, the integrated multiphase flow meter system disclosed herein can determine the density of one liquid (e.g. oil density) in embodiments in which the density of the second liquid is known. This is frequently the case of crude oil-water mixtures, where the water density is usually constant (e.g. 1,000 kg/m$^3$), whereas the density of oil may range from about 750 to about 950 kg/m$^3$. This may require use of an additional water-cut meter such as a microwave-based water-cut meter. Using Equation 1, the oil density can be determined by calculating the velocity of ultrasonic waves in oil, vo.

Figure 6:
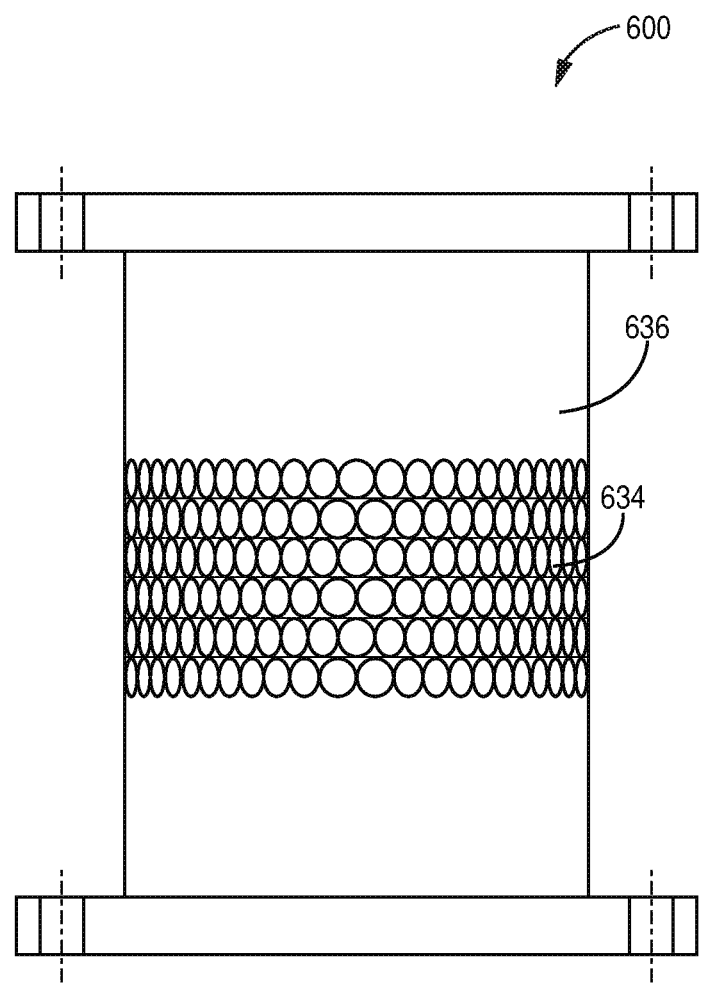
FIG. 6 is a schematic diagram of a portion of a multiphase flow meter system including a plurality of ultrasonic elements arranged in an array, according to one or more embodiments of the invention.

FIG. 6 is a schematic diagram showing a portion of a multiphase flow meter system 600 in which several arrays of ultrasonic elements 634 (e.g., a plurality of ultrasonic elements arranged in an array or one or more arrays) around a conduit 636 are used to provide a three-dimensional profile measurement, instead of two-dimensional cross-sectional measurement, according to one or more embodiments of the invention.

Figure 7:
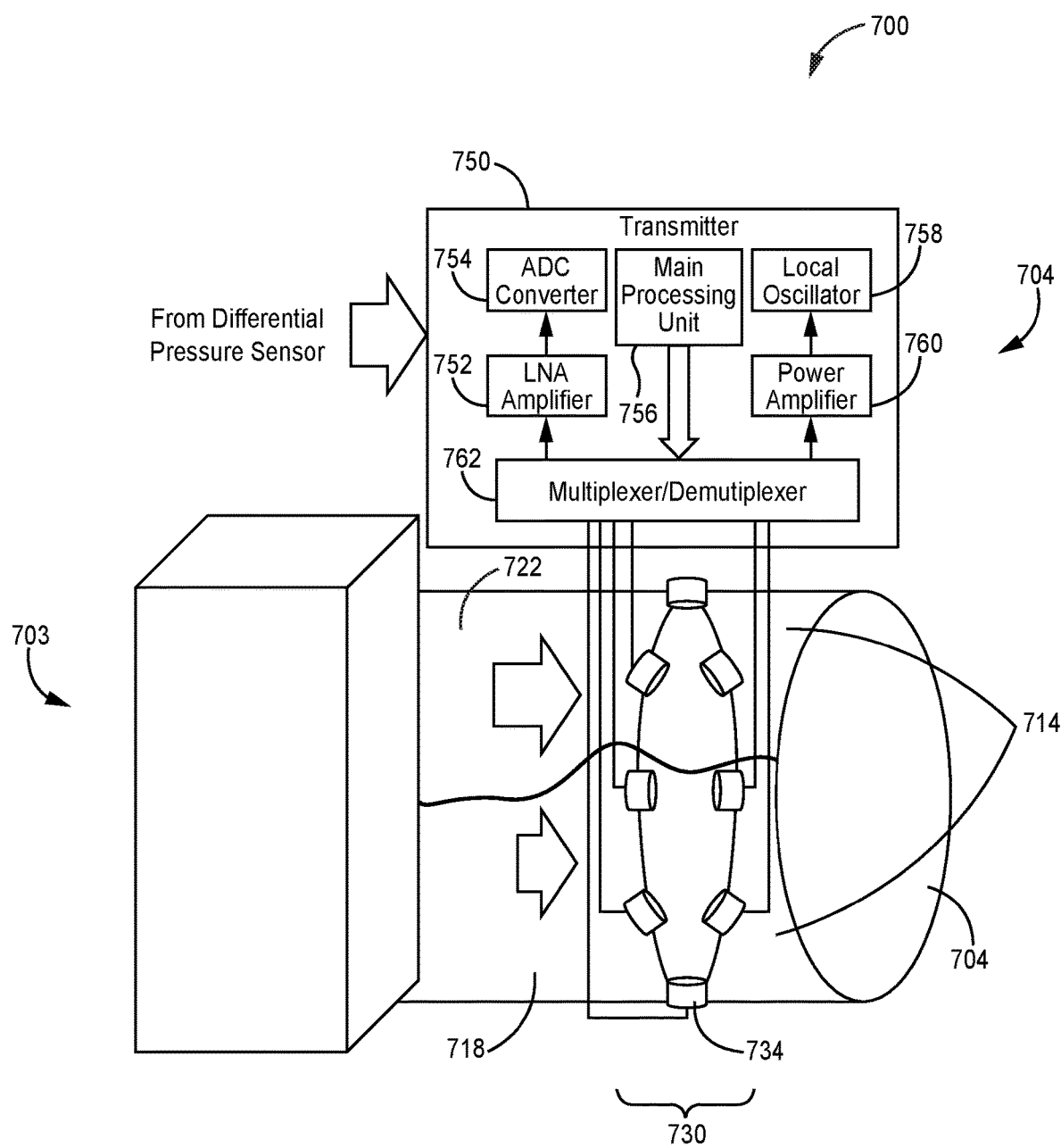
FIG. 7 is an isometric view of a portion of a multiphase flow meter system for measuring one or more properties of a multiphase fluid in stratified flow, the portion including an inline flow conditioner and a non-radioactive sensor system, according to one or more embodiments of the invention.

FIG. 7 is an isometric view of a conduit including a multiphase fluid flowing in stratified flow and a portion of a multiphase flow meter system, according to one or more embodiments of the invention. In the illustrated embodiment, a second inline flow conditioner 703 generates a stratified flow 714 with the liquid phase 718 flowing at the bottom of the probe and the air phase 722 flowing at the top of the probe. In this case, the ultrasonic elements 734 of the ultrasonic probe 730 which encircle the liquid phase allows to determine the GVF and water-cut values, using the same equations (1) to (10). In other respects, this embodiment may be similar to the embodiment presented in FIGS. 5-6. Also shown in FIG. 7 is a transmitter 750. Each ultrasonic element of the plurality of ultrasonic elements may be in communication with a transmitter 750 which is configured to transmit and receive signals from at least each of the plurality of ultrasonic elements. Although not shown, in some embodiments, the transmitter 750 is in communication with one or more other modules disclosed herein, such as a flow meter. In some embodiments, the transmitter 750 is configured to communicate with the one or more ultrasonic elements 734 to generate ultrasonic waves. For example, in some embodiments, the transmitter 750 includes a low noise amplifier 752, an analog-to-digital converter 754, a main processing unit 756, a local oscillator 758, a power amplifier 760, and a multiplexer/demultiplexer 762. In some embodiments, the transmitter 750 is also configured to receive data from one or more sensors of a flow meter, such as the first pressure sensor and the second pressure sensor of a venturi meter. In some embodiments, the transmitter 750 receives and/or transmits data and computes one or more properties of the multiphase fluid.

In some embodiments, an integrated multiphase flow meter system includes one or more modules, wherein the one or more modules include one or more of a flow homogenizer for homogenizing the flow of a multiphase fluid including a gas phase and a liquid phase and for reducing a slip velocity between the liquid phase and the gas phase, a flow meter fluidly connected to the flow homogenizer for measuring a total volumetric flow rate of the multiphase fluid, an inline flow conditioner for separating a liquid phase and a gas phase of the multiphase fluid, and a non-radioactive sensor system including a liquid-gas fraction measurement sensor for measuring one or more of a liquid fraction of the multiphase fluid and a gas fraction of the multiphase fluid and further including a water-cut meter for measuring a water fraction of the multiphase fluid, wherein the water-cut meter is downstream from the liquid-gas fraction measurement sensor.

In some embodiments, a compact multiphase flow meter is provided for measuring the flow rates of a multiphase flow comprising a gas phase and a liquid phase; where the liquid phase is composed of maximum two types of liquids (e.g. crude oil and water). The apparatus, which can operate at very high pressure, is composed of a flow homogenizer to homogenize the flow which consequently reduce the slip velocity between the liquid phase and gas phase, followed by flow meter which measures the total volumetric flow rate, followed by an inline flow conditioner that separates liquid from gas and a non-radioactive sensor system which comprises a gas void fraction (GVF) measurement sensor followed by a water-cut meter. Additionally, the probe can also measure the density of the liquid phase, which remains a challenging task especially downhole wellbores. The apparatus can be a good alternative to the existing solutions, which mainly use γ-ray, from both the safety and cost points of view. It can be in particular used in upstream oil industry, both for surface and downhole measurements to measure the fluid properties, as well as in petrochemical, food, cosmetic dairy, biotech, and pharmaceutical industries where a multiphase flow measurement is required.

In some embodiments, one or more multiphase flow meters is installed or integrated with a pipeline, in one or more locations, within an oil-gas field to determine the flow rates of one or more of a gas phase and a liquid phase, and/or to determine the density of the liquid phase. The flow meter may operate either at the surface, immediately downstream a well head, or undersea in an offshore oil field, immediately downstream a well head. In addition, having a small compact size, one or more multiphase flow meters may also be installed downhole, within a well. The multiphase flow meter may include a first inline flow conditioner to homogenize multiphase fluid flow and reduce a slip velocity between the liquid phase and the gas phase, a flow meter downstream from the first inline flow conditioner for measuring the total volumetric flow rate of the multiphase flow, a second inline flow conditioner downstream from the flow meter for separating the liquid phase from the gas phase (e.g. annular flow or stratified flow), and a non-radioactive sensor system downstream from the second inline flow meter, the non-radioactive sensor system including a liquid-gas fraction measurement sensor and a water-cut meter downstream from the liquid-gas fraction measurement sensor.

In some embodiments, a multiphase flow meter system may be operable under harsh conditions, including high pressures, to measure one or more properties of a multiphase fluid flowing through a pipeline segment. The integrated multiphase flow meter system may include a first inline flow conditioner which may be configured to homogenize the multiphase fluid before flowing the multiphase fluid through a flow meter. The first inline flow conditioner may homogenize the multiphase fluid by reducing a slip velocity between a gas phase and a liquid phase of the multiphase fluid. The flow meter may include one or more sensors for measuring a total volumetric flow rate or a total mass flow rate of the multiphase fluid. From the flow meter, the multiphase fluid may be fed to a downstream second inline flow conditioner. The second inline flow conditioner may separate the gas phase and the liquid phase by generating either an annular flow or a stratified flow. Upon exiting the second inline flow conditioner, the multiphase fluid may pass through a sensor system configured to measure one or more additional properties of the multiphase fluid.

Figure 8:
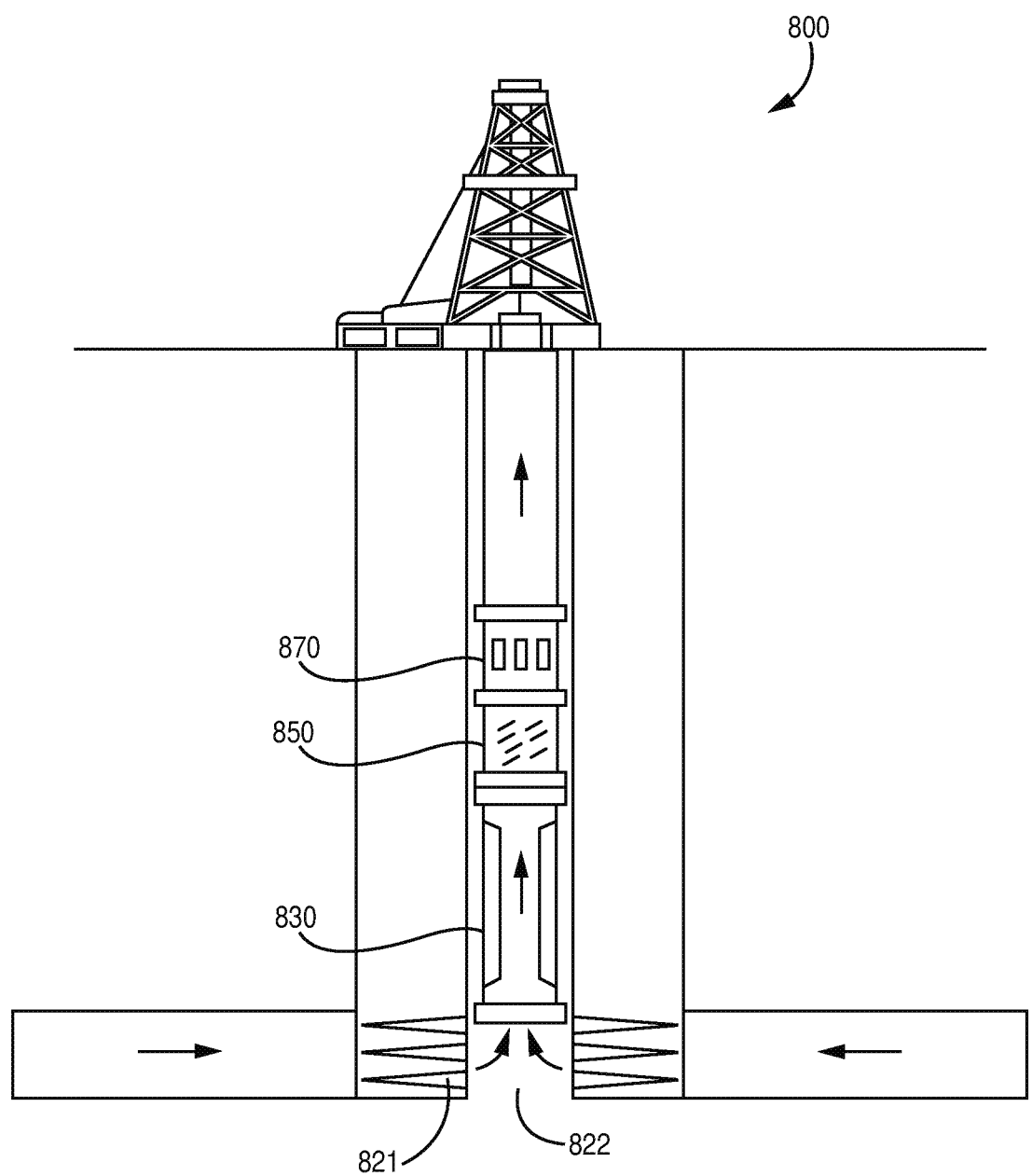
FIG. 8 is a schematic diagram of a multiphase flow meter system deployed downhole inside a borehole, according to one or more embodiments of the invention.

FIG. 8 is a schematic diagram of a multiphase flow meter system deployed downhole inside a borehole, according to one or more embodiments of the invention. Taking advantage of its compact size, the integrated multiphase flow meter system may be deployed downhole inside a borehole 822 to measure in real-time the individual flow rates and other fluid properties such as liquid density of the multiphase flow which pass through the borehole 822 via the packers 821. For example, a flow meter 830, a second inline flow conditioner 850, and a sensor system 870 may be provided downhole inside the borehole 822. Although not shown, a first inline flow conditioner 810 may also be employed. Hence, the integrated multiphase flow meter system may be a good alternative, from both the safety and cost points of view, to the existing solutions which mainly use γ-ray. It may also be a good alternative to substitute model-based virtual multiphase flow meters, some of which suggest using distributed temperature sensing (DTS) and pressure sensor to estimate the multiphase flow properties. In addition, the apparatus can be used in any other application which requires real-time measurement of the fluid properties such as in petrochemical, food, cosmetic dairy, biotech, and pharmaceutical industries and also in geothermal plants to measure the gas void fraction from each vent/spring to determine the enthalpy of the two phase fluid produced from each well and hence estimate the electrical energy output.

Figure 9:
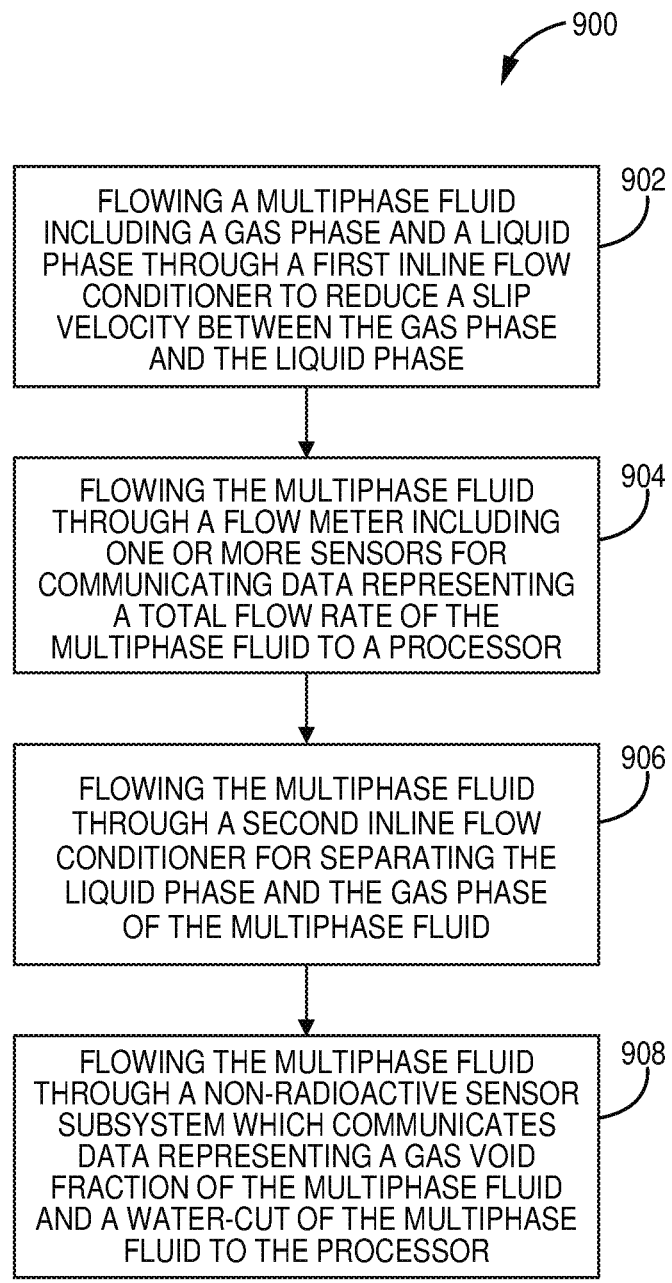
FIG. 9 is a flowchart of a method of measuring one or more properties of a multiphase fluid, according to one or more embodiments of the invention.

FIG. 9 is a flowchart of a method of measuring one or more properties of a multiphase fluid, according to one or more embodiments of the invention. As shown in FIG. 9, the method 900 may include one or more of the following steps: flowing 902 a multiphase fluid including a gas phase and a liquid phase through a first inline flow conditioner to reduce a slip velocity between the gas phase and the liquid phase; flowing 904 the multiphase fluid through a flow meter including one or more sensors for communicating data representing a total flow rate of the multiphase fluid to a processor; flowing 906 the multiphase fluid through a second inline flow conditioner for separating the liquid phase and the gas phase of the multiphase fluid; and flowing 908 the multiphase fluid through a non-radioactive sensor subsystem which communicates data representing a gas void fraction of the multiphase fluid and a water-cut of the multiphase fluid to the processor; wherein the processor computers a flow rate of the liquid phase and the gas phase of the multiphase fluid using the data communicated by the flow meter and the non-radioactive sensor subsystem.

While the invention is provided in the context of the oil and gas industry and related processes, the advantages conferred to the oil and gas industry may also be extended to other industries, including, for example and without limitation, the petrochemical industry, food industry, cosmetic industry, diary industry, biotech industry, pharmaceutical industry, in geothermal plants, and the like. More specifically, one or more of the multiphase flow meters may be integrated with other processes and systems other than onshore oil production facilities and offshore oil production facilities. For example, in other embodiments, one or more multiphase flow meter systems may be integrated with one or more of the following processes and/or systems: a petrochemical production facility, a food production facility, a cosmetic production facility, a diary production facility, a biotech production facility a pharmaceutical production facility, a geothermal plant, and the like.

DISCUSSION OF POSSIBLE EMBODIMENTS

The following are non-exclusive descriptions of possible embodiments of the present invention.

According to one aspect, a multiphase flow meter system may include one or more of the following modules: a first inline flow conditioner for reducing a slip velocity between a liquid phase and a gas phase of the multiphase fluid, wherein the first inline flow conditioner receives the multiphase fluid from a flow inlet; a flow meter including one or more flow sensors for communicating data representing a total flow rate of the multiphase fluid, wherein the flow meter is downstream from and fluidly connected to the first inline flow conditioner; a second inline flow conditioner for separating the liquid phase and the gas phase of the multiphase fluid, wherein the second inline flow conditioner is downstream from and fluidly connected to the flow meter; a non-radioactive sensor subsystem for communicating data representing a gas void fraction of the multiphase fluid and a water-cut of the multiphase fluid, wherein the non-radioactive sensor subsystem is downstream from the second inline flow conditioner; and a processor for receiving data from the flow meter and the non-radioactive sensor subsystem and computing a flow rate of the liquid phase and a flow rate of the gas phase of the multiphase fluid.

The multiphase flow meter system may optionally include, additionally and/or alternatively, any one or more of the following features, configurations, and/or additional components.

In some aspects, the first inline flow conditioner includes a flow homogenizer, the flow homogenizer including a horizontal pipe segment fluidly connected to a vertical pipe segment via a 90° pipe elbow.

In some aspects, the total flow rate includes one of a total volumetric flow rate and a total mass flow rate.

In some aspects, the one or more flow sensors of the flow meter include a first pressure sensor and a second pressure sensor, wherein the first pressure sensor and the second pressure sensor communicate data representing a differential pressure between the first pressure sensor and the second pressure sensor.

In some aspects, wherein the second inline flow conditioner is configured to generate an annular flow in which the liquid phase is an outer phase and the gas phase in an inner phase.

In some aspects, the second inline flow conditioner is configured to generate a stratified flow.

In some aspects, the non-radioactive sensor subsystem includes a liquid-gas fraction measurement sensor for communicating data representing a gas void fraction of the multiphase fluid.

In some aspects, the non-radioactive sensor subsystem further includes a water-cut sensor downstream from the liquid-gas fraction measurement sensor, wherein the water-cut sensor communicates data representing a water-cut of the multiphase fluid.

In some aspects, the non-radioactive sensor subsystem includes an ultrasonic probe for communicating data representing a gas void fraction of the multiphase fluid and a water-cut of the multiphase fluid.

In some aspects, the ultrasonic probe includes one or more ultrasonic elements for emitting an ultrasonic wave.

In some aspects, the liquid phase includes a first liquid and a second liquid.

In some aspects, the flow rate of the liquid phase includes a first flow rate of a first liquid and a second flow rate of a second liquid.

In some aspects, the processor further computes a density of at least one of the liquid phase and the gas phase of the multiphase fluid.

In some aspects, an oil and/or gas production facility comprising one or more of the multiphase fluid meter systems disclosed herein is provided.

According to a further aspect, a method of measuring one or more flow rates of a multiphase fluid may include one or more of the following steps: flowing a multiphase fluid including a gas phase and a liquid phase through a first inline flow conditioner to reduce a slip velocity between the gas phase and the liquid phase; flowing the multiphase fluid through a flow meter including one or more sensors for communicating data representing a total flow rate of the multiphase fluid to a processor; flowing the multiphase fluid through a second inline flow conditioner for separating the liquid phase and the gas phase of the multiphase fluid; and flowing the multiphase fluid through a non-radioactive sensor subsystem which communicates data representing a gas void fraction of the multiphase fluid and a water-cut of the multiphase fluid to the processor; wherein the processor computers a flow rate of the liquid phase and the gas phase of the multiphase fluid using the data communicated by the flow meter and the non-radioactive sensor subsystem.

The method may optionally include, additionally and/or alternatively, any one or more of the following features, configurations, and/or additional components.

In some aspects, the first inline flow conditioner includes a flow homogenizer, the flow homogenizer including a horizontal pipe segment fluidly connected to a vertical pipe segment via a 90° pipe elbow.

In some aspects, the total flow rate includes one of a total volumetric flow rate and a total mass flow rate.

In some aspects, the one or more flow sensors of the flow meter include a first pressure sensor and a second pressure sensor, wherein the first pressure sensor and the second pressure sensor communicate data representing a differential pressure between the first pressure sensor and the second pressure sensor.

In some aspects, wherein the second inline flow conditioner is configured to generate an annular flow in which the liquid phase is an outer phase and the gas phase in an inner phase.

In some aspects, the second inline flow conditioner is configured to generate a stratified flow.

In some aspects, the non-radioactive sensor subsystem includes a liquid-gas fraction measurement sensor for communicating data representing a gas void fraction of the multiphase fluid.

In some aspects, the non-radioactive sensor subsystem further includes a water-cut sensor downstream from the liquid-gas fraction measurement sensor, wherein the water-cut sensor communicates data representing a water-cut of the multiphase fluid.

In some aspects, the non-radioactive sensor subsystem includes an ultrasonic probe for communicating data representing a gas void fraction of the multiphase fluid and a water-cut of the multiphase fluid.

In some aspects, the ultrasonic probe includes one or more ultrasonic elements for emitting an ultrasonic wave.

In some aspects, the liquid phase includes a first liquid and a second liquid.

In some aspects, the flow rate of the liquid phase includes a first flow rate of a first liquid and a second flow rate of a second liquid.

In some aspects, the processor further computes a density of at least one of the liquid phase and the gas phase of the multiphase fluid.

What is claimed is:
1. A multiphase flow meter system comprising:
a first inline flow conditioner for reducing a slip velocity between a liquid phase and a gas phase of the multiphase fluid, wherein the first inline flow conditioner receives the multiphase fluid from a flow inlet;
a flow meter including one or more flow sensors for communicating data representing a total flow rate of the multiphase fluid, wherein the flow meter is downstream from and fluidly connected to the first inline flow conditioner;
a second inline flow conditioner for separating the liquid phase and the gas phase of the multiphase fluid, wherein the second inline flow conditioner is downstream from and fluidly connected to the flow meter;
a non-radioactive sensor subsystem for communicating data representing a gas void fraction of the multiphase fluid and a water-cut of the multiphase fluid, wherein the non-radioactive sensor subsystem is downstream from the second inline flow conditioner; and
a processor for receiving data from the flow meter and the non-radioactive sensor subsystem and computing a flow rate of the liquid phase and a flow rate of the gas phase of the multiphase fluid.

2. The multiphase flow meter system according to claim 1, wherein the first inline flow conditioner includes a flow homogenizer, the flow homogenizer including a horizontal pipe segment fluidly connected to a vertical pipe segment via a 90° pipe elbow.

3. The multiphase flow meter system of claim 1, wherein the total flow rate includes one of a total volumetric flow rate and a total mass flow rate.

4. The multiphase flow meter system of claim 1, wherein the one or more flow sensors of the flow meter include a first pressure sensor and a second pressure sensor, wherein the first pressure sensor and the second pressure sensor communicate data representing a differential pressure between the first pressure sensor and the second pressure sensor.

5. The multiphase flow meter system of claim 1, wherein the second inline flow conditioner is configured to generate an annular flow in which the liquid phase is an outer phase and the gas phase in an inner phase.

6. The multiphase flow meter system of claim 1, wherein the second inline flow conditioner is configured to generate a stratified flow.

7. The multiphase flow meter system of claim 1, wherein the non-radioactive sensor subsystem includes a liquid-gas fraction measurement sensor for communicating data representing a gas void fraction of the multiphase fluid.

8. The multiphase flow meter system according to claim 7, wherein the non-radioactive sensor subsystem further includes a water-cut sensor downstream from the liquid-gas fraction measurement sensor, wherein the water-cut sensor communicates data representing a water-cut of the multiphase fluid.

9. The multiphase flow meter system of claim 1, wherein the non-radioactive sensor subsystem includes an ultrasonic probe for communicating data representing a gas void fraction of the multiphase fluid and a water-cut of the multiphase fluid.

10. The multiphase flow meter system according to claim 9, wherein the ultrasonic probe includes one or more ultrasonic elements for emitting an ultrasonic wave.

11. The multiphase flow meter system of claim 1, wherein the liquid phase includes a first liquid and a second liquid.

12. The multiphase flow meter system of claim 1, wherein the flow rate of the liquid phase includes a first flow rate of a first liquid and a second flow rate of a second liquid.

13. The multiphase flow meter system of claim 1, wherein the processor further computes a density of at least one of the liquid phase and the gas phase of the multiphase fluid.

14. An oil and/or gas production facility comprising one or more multiphase fluid meter systems;
wherein the multiphase fluid meter system includes a first inline flow conditioner for reducing a slip velocity between a liquid phase and a gas phase of the multiphase fluid, wherein the first inline flow conditioner receives the multiphase fluid from a flow inlet;
a flow meter including one or more flow sensors for communicating data representing a total flow rate of the multiphase fluid, wherein the flow meter is downstream from and fluidly connected to the first inline flow conditioner;
a second inline flow conditioner for separating the liquid phase and the gas phase of the multiphase fluid, wherein the second inline flow conditioner is downstream from and fluidly connected to the flow meter;
a non-radioactive sensor subsystem for communicating data representing a gas void fraction of the multiphase fluid and a water-cut of the multiphase fluid, wherein the non-radioactive sensor subsystem is downstream from the second inline flow conditioner; and
a processor for receiving data from the flow meter and the non-radioactive sensor subsystem and computing a flow rate of the liquid phase and a flow rate of the gas phase of the multiphase fluid.

15. A method of measuring one or more flow rates of a multiphase fluid, the method comprising:
flowing a multiphase fluid including a gas phase and a liquid phase through a first inline flow conditioner to reduce a slip velocity between the gas phase and the liquid phase;
flowing the multiphase fluid through a flow meter including one or more sensors for communicating data representing a total flow rate of the multiphase fluid to a processor;
flowing the multiphase fluid through a second inline flow conditioner for separating the liquid phase and the gas phase of the multiphase fluid; and
flowing the multiphase fluid through a non-radioactive sensor subsystem which communicates data representing a gas void fraction of the multiphase fluid and a water-cut of the multiphase fluid to the processor;
wherein the processor computers a flow rate of the liquid phase and the gas phase of the multiphase fluid using the data communicated by the flow meter and the non-radioactive sensor subsystem.

16. The method according to claim 15, wherein the second inline flow conditioner generates an annular flow in which the liquid phase is an outer phase and the gas phase is an inner phase, or a stratified flow.

17. The method of claim 15, wherein the non-radioactive sensor subsystem includes an ultrasonic probe and wherein the ultrasonic probe communicates data representing the gas void fraction of the multiphase fluid and the water-cut of the multiphase fluid.

18. The method according to claim 17, wherein the ultrasonic probe includes one or more ultrasonic elements for emitting an ultrasonic wave.

19. The method of claim 15, wherein the flow rate of the liquid phase includes a first flow rate of a first liquid and a second flow rate of a second liquid.

20. The method of claim 15, wherein the processor further computes a density of at least one of the liquid phase and the gas phase of the multiphase fluid.

* * * * *